US009344995B2

(12) United States Patent
Lim

(10) Patent No.: US 9,344,995 B2
(45) Date of Patent: May 17, 2016

(54) METHOD FOR TRANSCEIVING PAGING MESSAGE IN WIRELESS COMMUNICATION SYSTEM AND APPARATUS FOR SAME

(71) Applicant: LG ELECTRONICS INC., Seoul (KR)

(72) Inventor: Jaewon Lim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/365,508

(22) PCT Filed: Dec. 17, 2012

(86) PCT No.: PCT/KR2012/010990
§ 371 (c)(1),
(2) Date: Jun. 13, 2014

(87) PCT Pub. No.: WO2013/089524
PCT Pub. Date: Jun. 20, 2013

(65) Prior Publication Data
US 2014/0378172 A1  Dec. 25, 2014

Related U.S. Application Data

(60) Provisional application No. 61/577,016, filed on Dec. 17, 2011.

(51) Int. Cl.
*H04W 68/02* (2009.01)
*H04W 68/12* (2009.01)
*H04W 84/12* (2009.01)

(52) U.S. Cl.
CPC .............. *H04W 68/02* (2013.01); *H04W 68/12* (2013.01); *H04W 84/12* (2013.01)

(58) Field of Classification Search
None
See application file for complete search history.

(56) References Cited

U.S. PATENT DOCUMENTS

| 2004/0017787 | A1* | 1/2004 | Shaheen et al. ............... 370/328 |
| 2004/0072593 | A1* | 4/2004 | Robbins et al. ............... 455/560 |
| 2007/0297373 | A1* | 12/2007 | Saifullah et al. .............. 370/338 |
| 2008/0259912 | A1* | 10/2008 | Wang ................... H04W 68/12 370/356 |
| 2009/0182871 | A1* | 7/2009 | Gupta .................. H04W 68/06 709/224 |

OTHER PUBLICATIONS

3rd Generation Partnership Project, Technical Specification Group Services and System Aspects; 3GPP system to Wireless Local Area Network (WLAN) interworking; System Description (Release 10), 3GPP TS 23.234 V10.0.0, Mar. 2011, 84 pages.

(Continued)

*Primary Examiner* — Daniel Lai
(74) *Attorney, Agent, or Firm* — Lee, Hong, Degerman, Kang & Walmey; Jonathan Kang; Michael Monaco

(57) ABSTRACT

Disclosed are a method for transceiving a paging message in a wireless communication system that supports a multiple radio access network and an apparatus for the method. In detail, the method comprises: a step of receiving, from a terminal, a paging redirection request message for requesting redirection of a paging message transmission path of a cellular network through a wireless local area network (WLAN) access point (AP) in the event the terminal accessed to a base station of the cellular network has switched the access thereof to the WLAN AP; a step of transmitting a paging redirection response message indicating whether the redirection of the paging message is authenticated or not to the terminal through the WLAN AP; and a step of transmitting a paging message to the terminal through the WLAN AP.

8 Claims, 8 Drawing Sheets

(a) Conventional UE cellular idle mode operation (b) UE cellular idle mode operation via WLAN

(56) References Cited

OTHER PUBLICATIONS

3rd Generation Partnership Project, "Technical Specification Group Services and System Aspects; Architecture enhancements for non-3GPP accesses (Release11)", 3GPP TS 23.402 V11.0.0, Sep. 2011, 232 pages.

Kyunghan Lee, et al. "Mobile Data Offloading: How Much Can Wifi Deliver?" CoNext 2010, Article No. 26, Dec. 2010, 12 pages.

Aruna Balasubramanian et al. "Augumenting Mobile 3G Using WiFi" MobiSys 2010, Jun. 2010, 13 pages.

PCT International Application No. PCT/KR2012/010990, Written Opinion of the International Searching Authority dated Mar. 29, 2013, 15 pages.

* cited by examiner

METHOD FOR TRANSCEIVING PAGING MESSAGE IN WIRELESS COMMUNICATION SYSTEM AND APPARATUS FOR SAME

CROSS-REFERENCE TO RELATED APPLICATIONS

This application is the National Stage filing under 35 U.S.C. 371 of International Application No. PCT/KR2012/010990, filed on Dec. 17, 2012, which claims the benefit of U.S. Provisional Application Ser. No. 61/577,016, filed on Dec. 17, 2011, the contents of which are hereby incorporated by reference herein in their entirety.

TECHNICAL FIELD

The present invention relates to a wireless communication system and, more particularly, a method for transceiving a paging message in a wireless communication system supporting multiple radio access networks, and an apparatus therefor.

BACKGROUND ART

The standards for wireless local area network (WLAN) technologies are being developed by Institute of Electrical and Electronics Engineers (IEEE) 802.11. IEEE 802.11a provides a transmission rate of 54 Mbps and IEEE 802.11b provides a transmission rate of 11 Mbps using an unlicensed band at 2.4 GHz or 5 GHz. IEEE 802.11g provides a transmission rate of 54 Mbps using orthogonal frequency-division multiplexing (OFDM) at 2.4 GHz. IEEE 802.11n provides a transmission rate of 300 Mbps for 4 spatial streams using Multiple Input Multiple Output OFDM (MIMO-OFDM). IEEE 802.11n supports channel bandwidths of up to 40 MHz and, in this case, provides a transmission rate of 600 Mbps.

DISCLOSURE

Technical Problem

An object of the present invention devised to solve the problem lies in a method for appropriately transmitting a paging message to a user equipment (UE) in a wireless communication system supporting multiple radio access networks, and an apparatus therefor.

Another object of the present invention devised to solve the problem lies in a method for transmitting a paging message of a cellular network via a wireless local area network (WLAN) to a user equipment (UE) when the UE has switched a network connection mode from cellular to WLAN, and an apparatus therefor.

It is to be understood that both the foregoing general description and the following detailed description of the present invention are exemplary and explanatory and are intended to provide further explanation of the invention as claimed.

Technical Solution

The object of the present invention can be achieved by providing a method for transmitting a paging message in a wireless communication system supporting multiple radio access networks, the method including receiving a paging redirection request message to request to change a path of the paging message of a cellular network from a user equipment (UE), which is connected to a base station of the cellular network, via a wireless local area network (WLAN) access point (AP) when the UE is reconnected to the WLAN AP, transmitting a paging redirection response message indicating whether the request of the paging redirection request message is accepted, via the WLAN AP to the UE, and transmitting the paging message via the WLAN AP to the UE.

In another aspect of the present invention, provided herein is an apparatus for transmitting a paging message in a wireless communication system supporting multiple radio access networks, the apparatus including a transceiving module for transceiving wired/wireless signals, and a processor receiving a paging redirection request message to request to change a path of the paging message of a cellular network from a user equipment (UE), which is connected to a base station of the cellular network, via a wireless local area network (WLAN) access point (AP) when the UE is reconnected to the WLAN AP, transmitting a paging redirection response message indicating whether the request of the paging redirection request message is accepted, via the WLAN AP to the UE, and transmitting the paging message via the WLAN AP to the UE.

The paging redirection request message may include paging interval request information determined using a transmission cycle of the paging message, which is configured by the cellular network.

The paging redirection response message may include paging interval information of the paging message, which is determined based on the paging interval request information.

The method may further include periodically receiving a UE association state report message including an identifier of the WLAN AP, from the UE via the WLAN AP.

The identifier of the WLAN AP may include an Internet protocol (IP) address of the WLAN AP or a medium access control (MAC) address of the WLAN AP.

Advantageous Effects

According to embodiments of the present invention, a paging message may be appropriately transmitted to a UE in a wireless communication system and, more particularly, in a wireless communication system supporting multiple radio access networks.

In addition, according to embodiments of the present invention, unnecessary power consumption of a UE may be prevented by transmitting a paging message of a cellular network via a WLAN to the UE.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
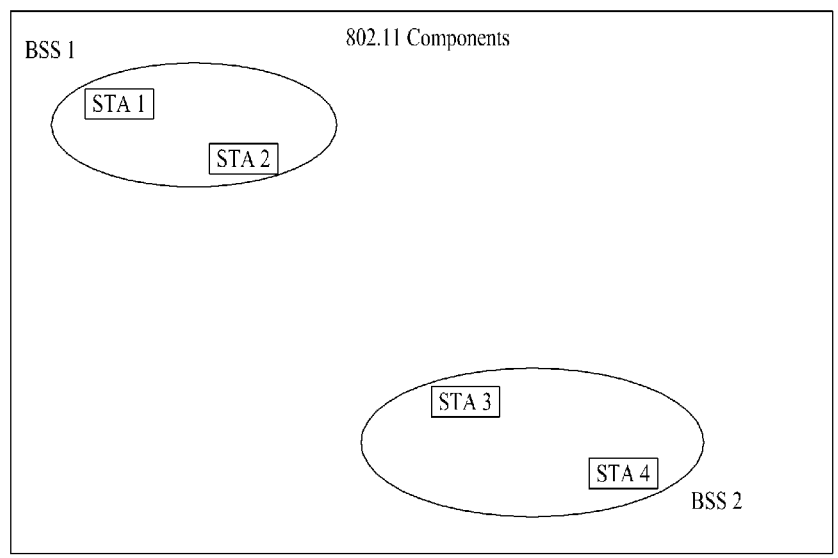
FIG. 1 is a view illustrating an exemplary architecture of a wireless local area network (WLAN) system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, to prevent the concept of the present invention from being ambiguous, structures and apparatuses of the known art will be omitted, or will be shown in the form of block diagram based on main functions of each structure and apparatus.

In the embodiments of the present invention, a description is made, centering on a data transmission and reception relationship between a base station and a terminal The base station means a terminal node of a network, which communicates directly with the terminal. In some cases, a specific operation described as performed by the base station may be performed by an upper node of the base station. Namely, it is apparent that, in a network composed of a plurality of network nodes including a base station, various operations performed for communication with a terminal may be performed by the base station or network nodes other than the base station. The term 'base station (BS)' may be replaced with the term 'fixed station', 'Node B', 'evolved Node B (eNode B or eNB)', 'access point (AP)', etc. The term 'relay' may be replaced with the term 'relay node (RN)', 'relay station (RS)', etc. The term 'terminal' may be replaced with the term 'user equipment (UE)', 'mobile station (MS)', 'mobile subscriber station (MSS)', 'subscriber station (SS)', 'advanced mobile station (AMS)', 'wireless terminal (WT)', 'machine-type communication (MTC) device, 'machine-to-machine (M2M) device, 'device-to-device (D2D) device', etc.

Specific terms used for the embodiments of the present invention are provided to help the understanding of the present invention. These specific terms may be replaced with other terms within the scope and spirit of the present invention.

The embodiments of the present invention can be supported by standard documents disclosed for at least one of radio access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those specifications. Further, all terms as set forth herein can be explained by the standard specifications.

Techniques described herein can be used in various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for Downlink (DL) and SC-FDMA for Uplink (UL). LTE-A is an evolution of 3GPP LTE.

1. Overview of a Wireless Local Area Network (WLAN) System to which the Present Invention is Applicable FIG. 1 is a view illustrating an exemplary architecture of a WLAN system.

Referring to FIG. 1, the WLAN system includes one or more basic service sets (BSSs). The BSS is a set of stations (STAs) which can communicate with each other due to successful synchronization therebetween. FIG. 1 shows two BSSs and two STAs connected to each BSS. Ovals illustrated in FIG. 1 denote coverage areas of the BSSs and called basic service areas (BSAs). When an STA moves out of its BSA, the STA may no longer communicate directly with another STA of the BSA.

The BSSs are classified into independent BSS (IBSS) and infrastructure BSS. The IBSS is the most basic type of the WLAN system, and FIG. 1 shows IBBSs. Direct communication between STAs is enabled in the IBSS, and this type of operation between STAs is called an ad hoc network.

To access the BSS, the STA should be synchronized with a BS. In addition, to access all services of the infrastructure BSS, the STA should be associated with the BS. This association procedure is performed dynamically and includes use of a distribution system service (DSS).

Figure 2:
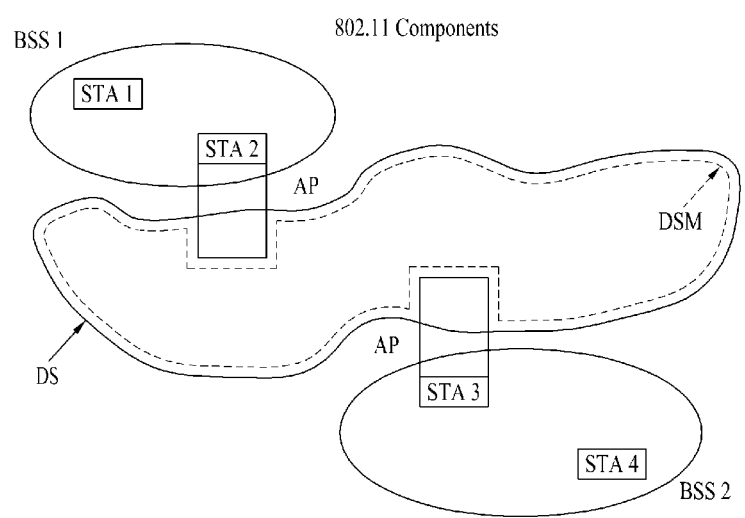
FIG. 2 is a view illustrating another exemplary architecture of a WLAN system.

FIG. 2 is a view illustrating another exemplary architecture of a WLAN system.

The direct distance between STA and STA can be physically limited. Depending on a network, this distance can be sufficient or can be insufficient to require coverage expansion. Thus, a BSS may be configured as one component of an expanded network composed on a plurality of BSSs. An architecture component for interconnecting BSSs is called a distribution system (DS).

A DS corresponds to a mechanism for interconnecting a plurality of APs and is not necessarily a network. As long as it provides a distribution service, the DS is not limited to any specific form. For example, the DS may be a wireless network such as a mesh network or a physical structure for interconnecting APs.

A distribution system medium (DSM) and a wireless medium (WM) can be logically separated in the WLAN system. These logical mediums are used by different architecture components for different purposes. As the DS provides logical services required for seamless integration of a plurality of BSSs and management of address mapping to destinations, device mobility is supported.

An AP is an entity for supporting access of an associated STA to a DS via a WM. Data is exchanged between a BSS and the DS via the AP. Here, since all APs can be STAs, the AP is also an entity having an address. However, the AP does not need to use the same address for communication via the WM and communication via a DSM.

Figure 3:
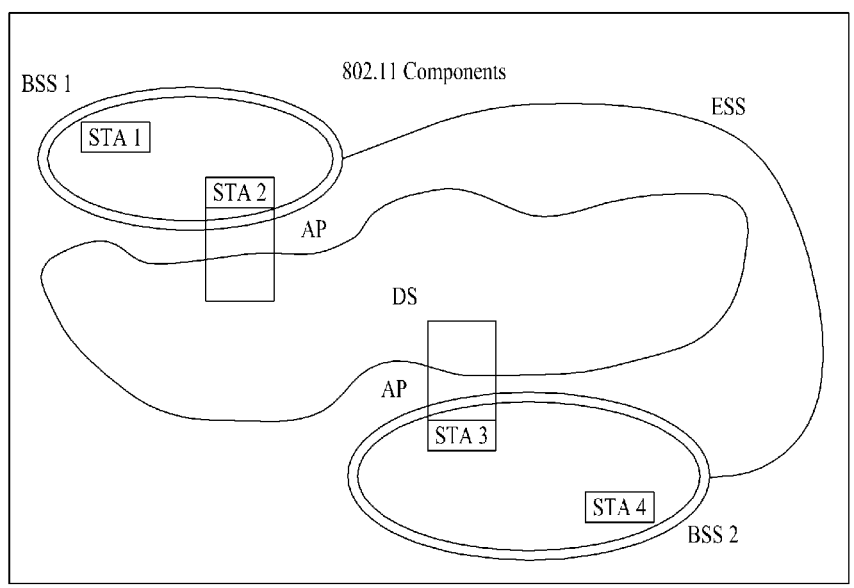
FIG. 3 is a view illustrating another exemplary architecture of a WLAN system.

FIG. 3 is a view illustrating another exemplary architecture of a WLAN system.

A wireless network having arbitrary size and complexity may be formed using a DS and BSSs, and this network type is called an extended service set (ESS) network. An ESS refers to a plurality of BSSs interconnected via the DS, and does not include the DS. Since the ESS network has the same logical link control (LLC) layer as an IBSS network, STAs included in the ESS may move from one BSS to another BSS within the ESS transparently to the LLC layer.

The BSSs may partially overlap with each other to form physically contiguous coverage areas. The logical distance between the BSSs is not restrictive and thus the BSSs may not be physically interconnected. Further, the BSSs may not be physically associated with each other to avoid redundancy. In addition, for the case in which an ad hoc network operates at a location having the ESS network, the case in which physically overlapping WLAN system networks are configured with different structures, or the case in which a plurality of different accesses or security policies are required at the same location, one (or more) IBBS(s) or ESS network(s) may be present in the physically same space as one (or more) ESS network(s).

An STA is a logical entity including a physical layer interface for a medium access control (MAC) layer and a wireless medium (WM), and may be an AP STA or a non-AP STA. Among STAs, a mobile terminal manipulated by a user is a non-AP STA. An STA usually refers to a non-AP STA. The non-AP STA may also be called a wireless transmit/receive unit (WTRU), a user equipment (UE), a mobile station (MS), a mobile terminal, a mobile subscriber unit, etc. An AP is an entity for providing access of an associated STA to a DS via a WM. Data is exchanged between a BSS and the DS via the AP. The AP is also called a centralized controller, a base station (BS), a node-B, a base transceiver system (BTS), a femto BS, a site controller, etc.

Figure 4:
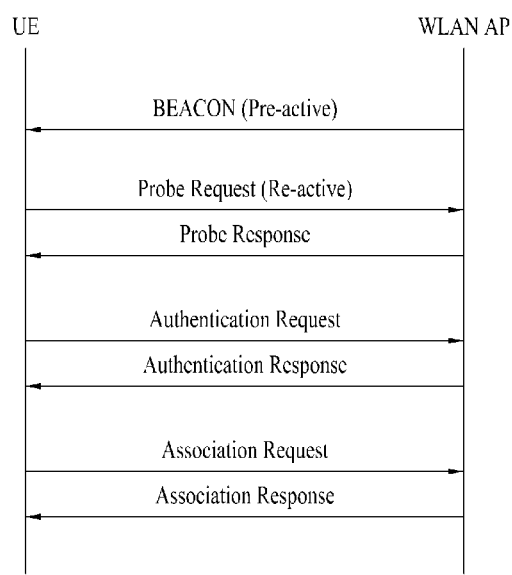
FIG. 4 is a view illustrating a procedure for accessing an access point (AP) by a user equipment (UE) in a WLAN system.

FIG. 4 is a view illustrating a procedure for accessing an AP by a UE in a WLAN system.

Referring to FIG. 4, the AP periodically generates and transmits a beacon frame in a broadcast format. The UE, which has received the beacon frame, senses presence of the AP. The beacon frame may be configured to include a header, a frame body and a frame check sequence (FCS), and carry information such as a timestamp, a beacon interval, capability, a service set identifier (SSID) and supported rates. The SSID is an identifier (ID) for identifying a plurality of different BSSs from each other in a WLAN system, and may also be called a BSS identifier (BSSID).

The UE receives beacon frames and checks presence of a plurality of accessible APs using the received beacon frames. This is called passive scanning The UE selects specific one of the APs and transmits a probe request frame to the selected AP.

The UE may store information about accessed APs as profiles. After that, the UE may select an AP using the profiles without receiving a beacon frame and transmit the probe request frame to the selected AP. This is called active scanning.

The probe request frame may be configured to include a header, a frame body and an FCS, and carry information such as an SSID and supported rates. As described above, the SSID is an ID for identifying BSSs from each other. Any UE which does not know a unique SSID of a specific BSS may not access the BSS. That is, the UE transmits the probe request frame including the SSID to access a specific BSS, e.g., AP.

The AP, which has received the probe request frame, transmits a probe response frame to the UE as a response to the probe request frame. The probe response frame may be configured to include a header, a frame body and an FCS, and carry information such as a timestamp, a beacon interval, capability, an SSID and supported rates. This is called a search procedure.

After the search procedure, the UE and the AP perform an authentication procedure. Specifically, after the probe response frame is received from the AP, the UE transmits an authentication request frame to the AP to request authentication. Then, the AP transmits an authentication response frame to the UE, thereby performing authentication between the AP and the UE. The authentication request frame and/or the authentication response frame may be configured to include a header, a frame body and an FCS, and carry information such as an authentication algorithm number, an authentication transaction sequence number and a status code.

After the authentication procedure, the UE and the AP perform an association procedure. Specifically, after authentication is performed between the AP and the UE, the UE transmits an association request frame to the AP. The association request frame may be configured to include a header, a frame body and an FCS, and carry information such as capability, a listen interval, an SSID and supported rates.

The AP transmits an association response frame to the UE as a response to the association request frame, and thus is connected to the UE. The association response frame may be configured to include a header, a frame body and an FCS, and carry information such as capability, a status code, an association ID (AID) and supported rates. Here, the AID refers to a specific ID given to each UE by the AP to identify a plurality of UEs from each other after the UE and the AP are associated with each other.

2. Paging Message Transceiving Method

When a UE, which is communicable using both a cellular mobile communication mode and a WLAN communication mode, is performing communication with a BS using the cellular communication mode and desires to switch to the WLAN communication mode, the UE is switched to an idle state/mode to minimize power consumption due to the cellular communication mode. The UE which operates in the cellular idle state should periodically scan a cellular channel to receive a paging message which is periodically transmitted from a mobility management entity (MME) of a mobile core network (CN), and thus unnecessary power consumption may occur.

The present invention proposes a method for transmitting information for cellular paging via a WLAN by a UE connected to the WLAN to reduce power consumption due to scanning of a cellular channel to receive a paging message.

In the following description, it is assumed that a UE has both a Radio Access Technology (RAT) function for communication using a cellular mobile communication mode and a RAT function for communication using a WLAN communication mode.

It is also assumed that a WLAN AP has a location registered by a specific mobile communication operator, and controllable by a BS or a mobile CN to which the BS is connected, and that the BS and the WLAN AP are connected to each other to be communicable via a specific network. Although an exemplary network architecture to which the present invention is applicable will be described below with reference to FIG. 5, the present invention is not limited thereto and applicable to any wireless communication system which supports heterogeneous (multiple) radio access networks.

Figure 5:
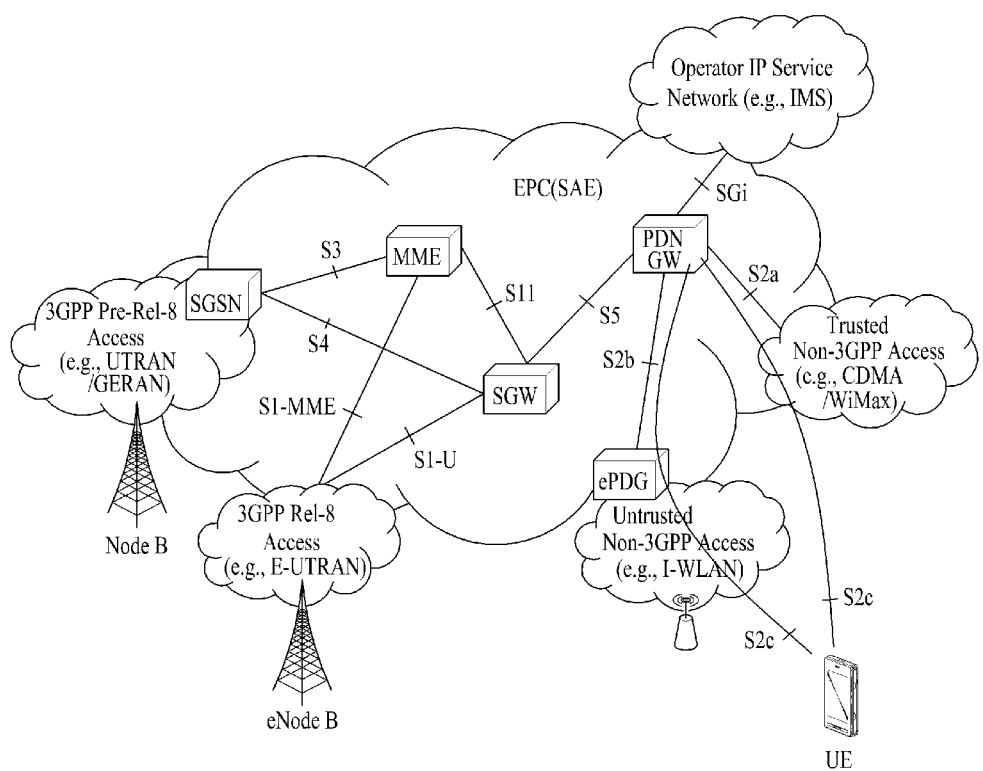
FIG. 5 is a view illustrating an exemplary network architecture to which the present invention is applicable.

FIG. 5 is a view illustrating an exemplary network architecture to which the present invention is applicable.

3GPP, which establishes the technical standards for $3^{rd}$ generation (3G) mobile communication systems, has started to study Long Term Evolution/System Architecture Evolution (LTE/SAE) technologies to optimize and improve the performances of 3GPP technologies around the end of 2004 to cope with various forums and new technologies related to $4^{th}$ generation (4G) mobile communication.

SAE mainly studied by 3GPP SA WG2 is a study item related to network technologies aimed to determine a network architecture and support mobility between heterogeneous networks in association with LTE of 3GPP TSG RAN, and is one of current significant standardization issues of 3GPP. This corresponds to a process for developing the 3GPP system to support various radio access technologies based on Internet protocols (IPs), and has been processed with a goal of an optimized packet-based system capable of minimizing transmission delay with improved data transfer capability.

SAE upper-level reference models defined by 3GPP SA WG2 include a non-roaming case and a roaming case with various scenarios. For details thereof, reference can be made to 3GPP TS 23.401 and TS 23.402. The network architecture of FIG. 5 is a brief version thereof, and shows a schematic architecture of Evolved Packet System (EPS) including Evolved Packet Core (EPC).

The EPC is a fundamental component of System Architecture Evolution (SAE) for improving the performances of 3GPP technologies. SAE corresponds to a study item for determining a network architecture for supporting mobility between various types of networks. SAE aims to support various radio access technologies based on, for example, IPs and provide an optimized packet-based system with improved data transmission capability.

Specifically, the EPC is a core network of an IP mobile communication system for a 3GPP LTE system and may support packet-based real-time and non-real-time services. In a conventional mobile communication system (e.g., $2^{nd}$ generation (2G) or $3^{rd}$ generation (3G) mobile communication system), a core network function was implemented using two separate sub-domains of a voice network (a circuit-switched (CS) network) and a data network (a packet-switched (PS) network). However, in a 3GPP LTE system which is evolved from the 3G communication system, sub-domains of a CS network and a PS network were unified into one IP domain. For example, in a 3GPP LTE system, an IP-capable UE and a UE may be connected to each other via an IP-based BS (e.g., eNodeB (evolved Node B)), an EPC, or an application domain (e.g., IP multimedia subsystem (IMS)). That is, the EPC is an inevitable structure for implementation of an end-to-end IP service.

The EPC may include various components. FIG. 5 shows a serving gateway (SGW), a packet data network gateway (PDN GW), a mobility management entity (MME), a serving GPRS (general packet radio service) supporting node (SGSN) and an enhanced packet data gateway (ePDG) as a part of the components included in the EPC.

The SGW operates as a boundary point between a radio access network (RAN) and a core network and is a component which performs a function for maintaining a data path between an eNodeB and the PDN GW. In addition, if a UE moves across an area served by the eNodeB, the SGW serves as an anchor point for local mobility. That is, packets may be routed via the SGW for mobility in an Evolved-UMTS (Universal Mobile Telecommunications System) Terrestrial Radio Access Network (E-UTRAN) defined after 3GPP Release-8. Further, the SGW may serve as an anchor point for mobility management with another 3GPP network such as RAN defined before 3GPP Release-8, e.g., UTRAN or GSM (Global System for Mobile communication)/EDGE (Enhanced Data rates for GSM Evolution) Radio Access Network (GERAN).

The PDN GW (or P-GW) corresponds to a termination point of a data interface directed to a packet data network. The PDN GW may support policy enforcement features, packet filtering and charging support. In addition, the PDN GW may serve as an anchor point for mobility management with a 3GPP network and a non-3GPP network (e.g., untrusted network such as Interworking Wireless Local Area Network (I-WLAN) and trusted network such as Code Division Multiple Access (CDMA) or WiMax).

Although the SGW and the PDN GW are configured as separate gateways in the network architecture of FIG. 5, the two gateways may be implemented according to a single gateway configuration option.

The MME performs signaling and control functions to support access of a UE for network connection, network resource allocation, tracking, paging, roaming and handover. The MME controls control plane functions related to subscriber and session management. The MME manages a large number of eNodeBs and performs signaling for selection of a typical gateway for handover to another 2G/3G network. In addition, the MME performs security procedures, terminal-to-network session handling, idle terminal location management, etc.

The SGSN handles all packet data such as mobility management and authentication of a user for another 3GPP network (e.g., GPRS network).

The ePDG serves as a security node for an untrusted non-3GPP network (e.g., I-WLAN, Wi-Fi hotspot, etc.).

As described above in relation to FIG. 5, an IP-capable UE may access an IP service network (e.g., IMS) provided by an operator, via various components in the EPC based on non-3GPP access as well as 3GPP access.

FIG. 5 also illustrates various reference points (e.g., S1-U, S1-MME, etc.). In the 3GPP system, a conceptual link connecting two functions of different functional entities of E-UTRAN and EPC is defined as a reference point. Among the reference points illustrated in FIG. 5, S2a and S2b correspond to non-3GPP interfaces. S2a is a reference point for providing a user plane with related control and mobility support between the trusted non-3GPP access and the PDNGW. S2b is a reference point for providing a user plane with related control and mobility support between the ePDG and the P-GW. S2c is a reference point between the UE and the P-GW.

As described above, to support non-3GPP interworking, in addition to a GPRS Tunneling Protocol (GTP) protocol conventionally used by 3GPP, various protocols of Internet Engineering Task Force (IETF) have been adopted. Specifically, IETF protocols such as Proxy Mobile IPv6 (PMIPv6) and Dual Stack Mobile IPv6 (DSMIPv6) have been adopted from the draft version before Request for Comments (RFC) of IETF, and current used as significant protocols for non-3GPP interworking according to the SAE standards. Basically, the GTP protocol is used for 3GPP Inter-RAT handover and the IETF-based protocols are used on S2 interfaces for non-3GPP interworking. In particular, reference point S5 for providing user plane tunneling and tunnel management between SGW and P-GW, and reference point S8 (not shown) for roaming may support both the GTP and IETF-based protocols.

A description is now given of a method for transmitting a paging message of a cellular network to a UE using a WLAN, and for periodically report that the UE is connected to a WLAN AP located in the coverage of an eNB, to the cellular network via the WLAN to indicate that the UE is currently located in the coverage of the eNB. Hereinafter, for convenience of explanation, an MME is described as an entity for transmitting the paging message of the cellular network. However, the MME is merely an example and any other network node in a wireless communication system supporting multiple radio access networks may perform this operation. In addition, the network node for transmitting the paging message may be implemented as a server or a device.

Figure 6:
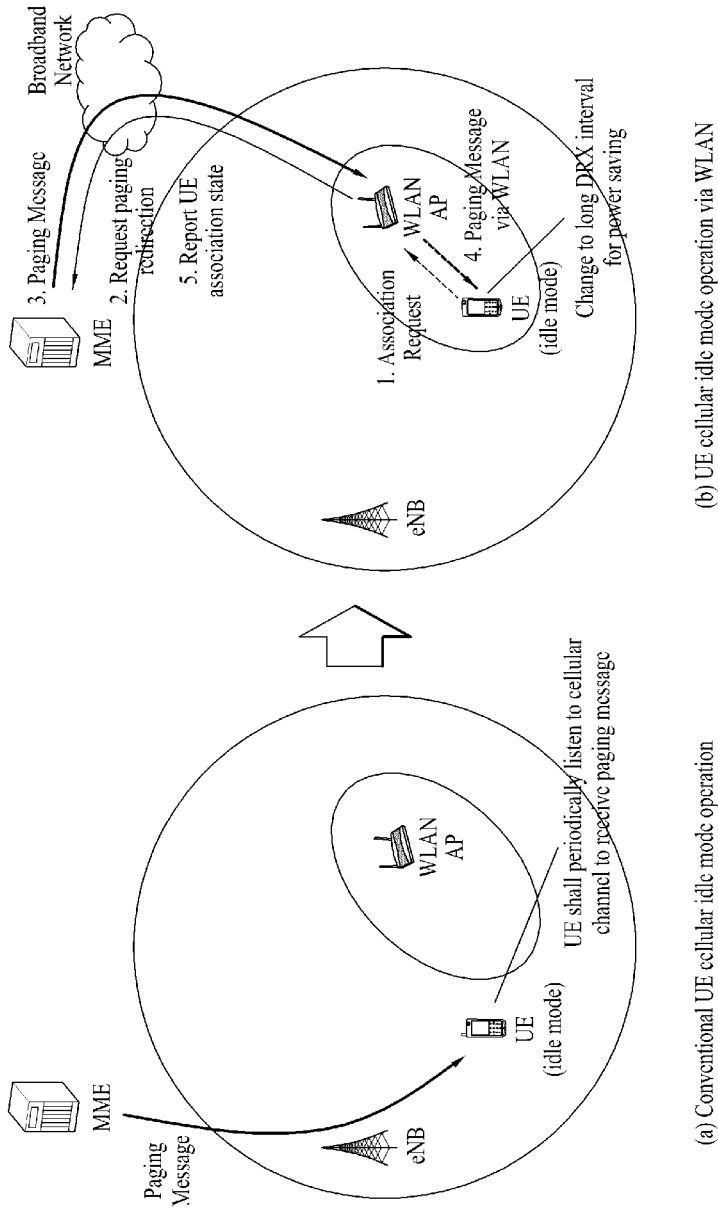
FIG. 6 is a view illustrating a paging message transceiving procedure via a WLAN, according to an embodiment of the present invention.

FIG. 6 is a view illustrating a paging message transceiving procedure via a WLAN, according to an embodiment of the present invention.

FIG. 6(*a*) illustrates a procedure for receiving a paging message when a UE connected to a cellular network operates in an idle state.

When the UE is performing communication in connection with an eNB using a cellular communication mode, if an adjacent WLAN AP is scanned, the UE may switch a network connection mode from cellular to WLAN via the WLAN AP to perform communication. In this case, an access procedure of the UE to the WLAN AP may follow the typical WLAN access procedure illustrated in FIG. 4.

After the network connection mode is switched to WLAN, an operation mode of the UE according to cellular communication of the UE is switched to an idle state/mode, and the UE periodically receives a paging message via a cellular network. The idle state refers to a state in which the UE is switched on but Radio Resource Control (RRC) connection is not established. Here, an RRC layer is a sublayer of radio interface layer 3 (Layer 3) which is present on the control plane, provides data transfer service to a non-access stratum (NAS), and controls the configurations of radio interface layers 1 and 2 (Layer 1, Layer 2).

As described above, since the UE, which operates in the idle state, should be switched to a state capable of periodically receiving a signal from a cellular network adapter to receive the paging message from the cellular network, additional power consumption occurs in addition to power consumption required for WLAN communication. That is, although actual data is not transceived via the cellular network, the UE should be switched to a state capable of receiving a signal on a cellular channel to receive the paging message, additional power consumption occurs.

FIG. 6(*b*) illustrates a procedure for receiving a paging message via a WLAN and periodically reporting a current state to a cellular network by a UE which operates in an idle state in a cellular communication mode.

1) When the UE is performing communication in connection with an eNB using a cellular communication mode, if an adjacent WLAN AP is scanned, the UE may switch a network connection mode from cellular to WLAN via the WLAN AP to perform communication. In this case, an access procedure of the UE to the WLAN AP may follow the typical WLAN access procedure illustrated in FIG. 4.

2) The UE, which is connected to the WLAN and has switched the connection to the cellular network to an idle state, transmits a paging redirection request message to an MME of a cellular core network via the WLAN AP to request to transmit a paging message for the UE via the WLAN.

3, 4) Then, the MME periodically transmits the paging message for the UE at a given paging interval via the WLAN to the UE. Here, to minimize power consumption of the UE, a discontinuous reception (DRX) value corresponding to an interval at which the UE finds and receives a signal from the cellular network may be greatly increased. The reason why the UE should receive a signal of a cellular eNB even at a large interval when the paging message is not received is because the eNB having coverage in which the UE is currently located needs to be checked to allow reconnection to the cellular network as necessary without delay.

5) The UE, which is performing communication in connection with the WLAN and periodically receives the paging message of the cellular network via the WLAN, periodically transmits a UE association state report message to the MME via the WLAN to report that the UE operates in connection with a WLAN AP located in the coverage of a specific eNB. Since the WLAN operates independently from the cellular network and thus the cellular network (e.g., MME) is not capable of knowing that the UE currently operates in the coverage of a specific eNB, the UE needs to periodically report that the UE is performing communication in connection with a WLAN AP located in the coverage of a specific eNB, to the MME.

Figure 7:
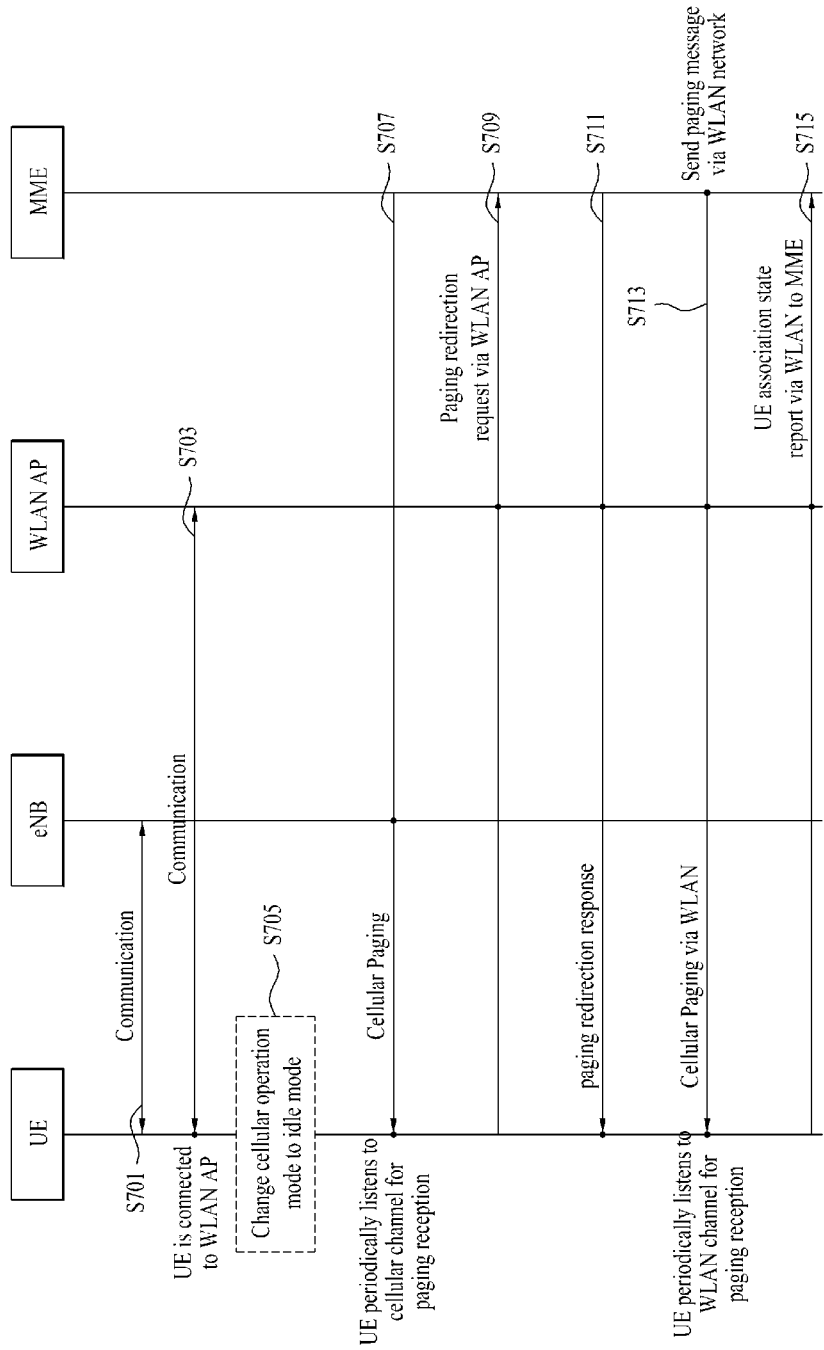
FIG. 7 is a view illustrating a paging message transceiving procedure via a WLAN, according to an embodiment of the present invention.

FIG. 7 is a view illustrating a paging message transceiving procedure via a WLAN, according to an embodiment of the present invention.

Referring to FIG. 7, when a UE is performing communication in connection with an eNB using a cellular communication mode (S701), if an adjacent WLAN AP is scanned, the UE may switch a network connection mode from cellular to WLAN via the WLAN AP to perform communication (S703). Here, the UE may scan for the WLAN AP by scanning for and receiving a beacon frame periodically transmitted by the WLAN AP.

As described above, the beacon frame may carry information such as a timestamp, a beacon interval, AP capability, an SSID and supported rates. The SSID is an ID for identifying a plurality of different BSSs from each other in a WLAN system, and may also be called a BSSID.

The UE, which is connected to the WLAN AP and has switched the network connection mode to WLAN, switches an operation mode according to the cellular communication mode to an idle state/mode (S705).

As the operation mode of the UE is switched, the UE periodically listens to a cellular channel (is switched to a state capable of receiving a signal from a cellular network adapter) to receive a paging message, and receives the paging message transmitted from an MME, via a cellular network, e.g., eNB (S707). Here, the paging message may be transmitted using, for example, typical downlink data transfer, and the UE scans L1/L2 control signaling (e.g., Physical Downlink Control Channel (PDCCH)) to find downlink scheduling assignment corresponding to the UE, and may receive the paging message transmitted on a downlink data channel (e.g., Physical Downlink Shared Channel (PDSCH)) if an ID (e.g., Paging Radio Network Temporary Identifier (P-RNTI)) used for paging is detected.

The UE, which is connected to the WLAN and has switched the connection to the cellular network to an idle state according to S705, transmits a paging redirection request message to an MME of a cellular core network via the connected WLAN AP to request to transmit the paging message via the WLAN (S709).

The paging redirection request message may carry information such as an address of the WLAN AP to which the UE is connected, a paging interval and a UE ID. Here, the WLAN AP address may be an IP address or a 48-bit MAC address of the WLAN AP. The MAC address refer to an address having a length of 48 bits and given to each communication device (e.g., WLAN network adapter of the device), and this address is a globally unique address. The paging interval refers to a cycle of receiving the paging message by the UE via the WLAN. Here, the paging interval of the cellular network may be configured differently for each UE using a parameter included in system information of the cellular network, and the paging interval of the WLAN may be determined relatively to the paging interval of the cellular network, which is configured before the UE is connected to the WLAN. The UE ID refers to identification information for recognizing the UE by the cellular network and, for example, an International Mobile Subscriber Identifier (IMSI) used in the cellular network may be used.

The MME, which has received the paging redirection request message from the UE, transmits a paging redirection response message to the UE via the WLAN AP to which the UE is connected, to inform the UE whether the paging redirection request is accepted (S711). That is, the MME may transmit the paging redirection response message to the UE via the WLAN AP using the WLAN AP address included in the paging redirection request message transmitted from the UE.

The paging redirection response message may carry information such as a UE ID and a paging interval. Here, the paging interval parameter included in the paging redirection response message refers to cycle information for transmitting the paging message by the MME via the WLAN, and indicates a value ultimately determined by the MME in consideration of a paging interval parameter included in the paging redirection request message of the UE. As described above, the paging interval of the cellular network may be configured differently for each UE using a parameter included in system information of the cellular network, and the paging interval of the WLAN may be determined relatively to the paging interval of the cellular network, which is configured before the UE is connected to the WLAN.

Here, if the MME transmits a paging redirection response message for rejecting the paging redirection request of the UE, to the UE, the UE receives a subsequent paging message via the cellular network as described in S707. Hereinafter, it is assumed, for convenience of explanation, that the MME has accepted the paging redirection request of the UE.

The MME, which has transmitted the paging redirection response message for accepting paging redirection to the UE, transmits the paging message for the UE at a given paging interval to the UE via the WLAN, i.e., the WLAN AP (S713). That is, the UE periodically listens to a WLAN channel according to the paging interval to receive the paging message, and receives the paging message transmitted from the MME, via the WLAN The UE periodically transmits a UE association state report message to the MME via the WLAN, i.e., the WLAN AP, to report that the UE operates in connection with a WLAN AP located in the coverage of a specific eNB (S715).

The UE association state report message may include a UE ID and a WLAN AP address. Here, the UE ID may be, for example, an IMSI used in the cellular network and the WLAN AP address may be, for example, an IP address or a 48-bit MAC address of the WLAN AP.

Meanwhile, if the UE releases connection to the currently connected WLAN AP and is reconnected to another WLAN AP located in the coverage of the same eNB due to mobility of the UE, the UE may transmit the paging redirection request message via the reconnected WLAN AP to the MME and receive the paging message of the cellular network via the reconnected WLAN AP. That is, steps from S709 may be repeated and the path of the paging message may be changed to the reconnected WLAN AP. Alternatively, the UE may transmit the UE association state report message via the reconnected WLAN AP to the MME and receive the paging message of the cellular network via the reconnected WLAN AP. That is, using S715 which is periodically performed, the path of the paging message may be changed to the reconnected WLAN AP. In this case, the information (e.g., paging interval) configured due to the paging redirection request message and/or the paging redirection response message to and/or from the previously connected WLAN AP may be equally used.

3. Overview of Apparatuses to which the Present Invention is Applicable

Figure 8:
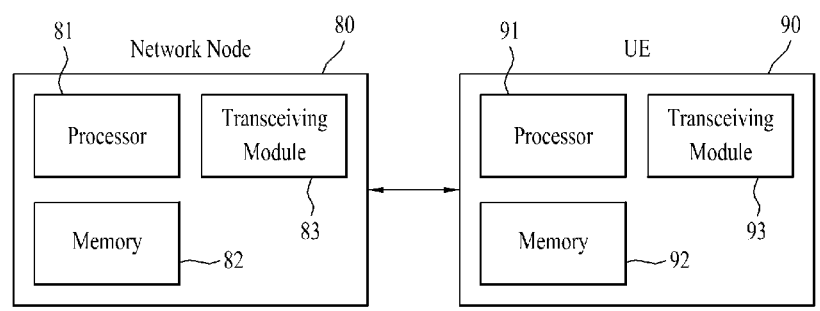
FIG. 8 is a block diagram of apparatuses of a wireless communication system, according to an embodiment of the present invention.

FIG. 8 is a block diagram of apparatuses of a wireless communication system, according to an embodiment of the present invention.

Referring to FIG. 8, the wireless communication system includes a network node 80 and a plurality of UEs 90 located in the wireless communication system. Here, the network node 80 may correspond to the MME, the eNB or the WLAN AP described above in the previous embodiments.

The network node 80 includes a processor 81, a memory 82 and a transceiving module 83. The processor 81 implements the proposed function, procedure and/or method. Layers of wired/wireless interface protocols may be implemented by the processor 81. The memory 82 is connected to the processor 81 and stores various types of information for driving the processor 81. The transceiving module 83 is connected to the processor 81 and transmits and/or receives wired/wireless signals.

The UE 90 includes a processor 91, a memory 92 and a transceiving module 93. The processor 91 implements the proposed function, procedure and/or method. Layers of wireless interface protocols may be implemented by the processor 91. The memory 92 is connected to the processor 91 and stores various types of information for driving the processor 91. The transceiving module 93 is connected to the processor 91 and transmits and/or receives wired/wireless signals.

The memory 82 or 92 may be located inside or outside the processor 81 or 91, and connected to the processor 81 or 91 using various well-known means. In addition, the network node 80 and/or the UE 90 may include a single antenna or multiple antennas.

The embodiments of the present invention described hereinabove are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

The above-described embodiments of the present invention may be implemented by various means, for example, hardware, firmware, software, or a combination thereof. In a hardware configuration, the methods according to embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to embodiments of the present invention may be implemented in the form of a module, a procedure, a function, etc. performing the above-described functions or operations. A software code may be stored in the memory 82 or 92 and executed by the processor 81 or 91. The memory 82 or 92 may be located inside or outside the processor 81 or 91 and exchange data with the processor 81 or 91 via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although the present invention is applied to a 3GPP LTE system and an IEEE 802.11 system in the above description, the present invention is also applicable to various radio access systems other than the 3GPP LTE system and the IEEE 802.11 system.

The invention claimed is:

1. A method for transmitting a paging message in a wireless communication system supporting multiple radio access networks, the method comprising:
   receiving a paging redirection request message to request to change a path of the paging message of a cellular network from a user equipment (UE), which is connected to a base station of the cellular network, via a wireless local area network (WLAN) access point (AP) when the UE is reconnected to the WLAN AP;
   transmitting a paging redirection response message indicating whether the request of the paging redirection request message is accepted, via the WLAN AP to the UE; and
   transmitting the paging message via the WLAN AP to the UE,
   wherein the paging redirection request message comprises paging interval request information determined using a transmission cycle of the paging message, which is configured by the cellular network.

2. The method according to claim 1, wherein the paging redirection response message comprises paging interval information of the paging message, which is determined based on the paging interval request information.

3. The method according to claim 1, further comprising periodically receiving a UE association state report message comprising an identifier of the WLAN AP, from the UE via the WLAN AP.

4. The method according to claim 3, wherein the identifier of the WLAN AP comprises an Internet protocol (IP) address of the WLAN AP or a medium access control (MAC) address of the WLAN AP.

5. An apparatus for transmitting a paging message in a wireless communication system supporting multiple radio access networks, the apparatus comprising:
   a transceiving module for transceiving wired/wireless signals; and
   a processor is configured to receive a paging redirection request message to request to change a path of the paging message of a cellular network from a user equipment (UE), which is connected to a base station of the cellular network, via a wireless local area network (WLAN) access point (AP) when the UE is reconnected to the WLAN AP, to transmit a paging redirection response message indicating whether the request of the paging redirection request message is accepted, via the WLAN AP to the UE, and to transmit the paging message via the WLAN AP to the UE,
   wherein the paging redirection request message comprises paging interval request information determined using a transmission cycle of the paging message, which is configured by the cellular network.

6. The apparatus according to claim 5, wherein the paging redirection response message comprises paging interval information of the paging message, which is determined based on the paging interval request information.

7. The apparatus according to claim 5, wherein the processor is configured to periodically receive a UE association state report message comprising an identifier of the WLAN AP, from the UE via the WLAN AP.

8. The apparatus according to claim 7, wherein the identifier of the WLAN AP comprises an Internet protocol (IP) address of the WLAN AP or a medium access control (MAC) address of the WLAN AP.

* * * * *